United States Patent
Singh et al.

(10) Patent No.: US 9,932,515 B2
(45) Date of Patent: Apr. 3, 2018

(54) FRACTURING FLUID CONTAINING A VISCOSIFYING AGENT AND CURABLE RESIN ADDITIVE

(71) Applicant: Halliburton Energy Services, Inc., Houston, TX (US)

(72) Inventors: Dipti Singh, Houston, TX (US); Jeremy Holtsclaw, Houston, TX (US); Aaron G. Russell, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/123,979

(22) PCT Filed: Apr. 2, 2014

(86) PCT No.: PCT/US2014/032657
§ 371 (c)(1),
(2) Date: Sep. 6, 2016

(87) PCT Pub. No.: WO2015/152914
PCT Pub. Date: Oct. 8, 2015

(65) Prior Publication Data
US 2017/0073573 A1    Mar. 16, 2017

(51) Int. Cl.
| | |
|---|---|
| *E21B 43/267* | (2006.01) |
| *C09K 8/68* | (2006.01) |
| *C09K 8/80* | (2006.01) |
| *C09K 8/88* | (2006.01) |
| *C09K 8/90* | (2006.01) |
| *E21B 43/26* | (2006.01) |

(52) U.S. Cl.
CPC .............. *C09K 8/685* (2013.01); *C09K 8/805* (2013.01); *C09K 8/887* (2013.01); *C09K 8/90* (2013.01); *E21B 43/26* (2013.01); *E21B 43/267* (2013.01); *C09K 2208/24* (2013.01); *C09K 2208/26* (2013.01)

(58) Field of Classification Search
None
See application file for complete search history.

(56) References Cited

U.S. PATENT DOCUMENTS

| | | |
|---|---|---|
| 5,981,447 A | 11/1999 | Chang et al. |
| 2008/0269082 A1 | 10/2008 | Wilson et al. |
| 2011/0240297 A1 | 10/2011 | Lord et al. |
| 2014/0054033 A1 | 2/2014 | Nguyen et al. |
| 2014/0076559 A1 | 3/2014 | Ogle et al. |
| 2016/0311992 A1* | 10/2016 | Kuczynski ............. A01N 25/28 |

OTHER PUBLICATIONS

Kottke; "Furan Derivatives"; Kirk-Othmer Encyclopedia of Chemical Technology; vol. 12; Dec. 4, 2000; p. 259-286.*
International Search Report and Written Opinion dated Dec. 23, 2014; International PCT Application No. PCT/US2014/032657.

* cited by examiner

*Primary Examiner* — Angela M DiTrani
*Assistant Examiner* — Andrew Sue-Ako
(74) *Attorney, Agent, or Firm* — McGuireWoods LLP

(57) ABSTRACT

A fracturing fluid comprising: a base fluid, wherein the base fluid comprises water; proppant; and an additive, wherein the additive: (i) is a cross-linkable polymer, wherein the polymer is a polysaccharide comprising a backbone and pendant functional groups, wherein the polysaccharide is derivatized by substituting one or more of the pendant functional groups with furan; (ii) is a viscosifying agent; and (iii) is a curable resin for consolidating the proppant. A method of fracturing a subterranean formation comprising: introducing the fracturing fluid into the subterranean formation; and creating or enhancing one or more fractures in the subterranean formation.

21 Claims, No Drawings

FRACTURING FLUID CONTAINING A VISCOSIFYING AGENT AND CURABLE RESIN ADDITIVE

TECHNICAL FIELD

Additives are commonly used in fracturing fluids. A viscosifying agent can be used to increase the viscosity of the fracturing fluid in order to suspend proppant in the fluid. Consolidation systems are also used to consolidate proppant of a proppant pack. A consolidation system generally includes a curable resin and a curable agent.

DETAILED DESCRIPTION OF THE INVENTION

As used herein, the words "comprise," "have," "include," and all grammatical variations thereof are each intended to have an open, non-limiting meaning that does not exclude additional elements or steps.

As used herein, a "fluid" is a substance having a continuous phase that tends to flow and to conform to the outline of its container when the substance is tested at a temperature of 71° F. (22° C.) and a pressure of 1 atmosphere "atm" (0.1 megapascals "MPa"). A fluid can be a liquid or gas. A homogenous fluid has only one phase; whereas a heterogeneous fluid has more than one distinct phase. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, or an injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation including, into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During wellbore operations, it is common to introduce a treatment fluid into the well. Examples of common treatment fluids include, but are not limited to, drilling fluids, spacer fluids, completion fluids, and work-over fluids. As used herein, a treatment fluid is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

Proppant is commonly used in conjunction with hydraulic fracturing operations (fracing operations). A fracturing fluid is pumped using a frac pump at a sufficiently high flow rate and high pressure into the wellbore and into the subterranean formation to create or enhance a fracture in the subterranean formation. Creating a fracture means making a new fracture in the formation. Enhancing a fracture means enlarging a pre-existing fracture in the formation. The newly-created or enhanced fracture will tend to close together after pumping of the fracturing fluid has stopped. To prevent the fracture from closing, a material must be placed in the fracture to keep the fracture propped open. A material used for this purpose is often referred to as proppant. The proppant is in the form of solid particles, which are generally suspended in the fracturing fluid, carried down hole, and deposited in the fracture as a proppant pack. The proppant pack props the fracture in an open position while allowing fluid flow through the permeability of the pack.

A viscosifier or suspending agent is commonly included in the frac fluid to suspend the proppant uniformly throughout the base fluid prior to and during pumping of the fluid into the wellbore. A suspending agent tends to gel a fluid, which can be useful in suspending an insoluble particulate, such as proppant, in the fluid. Historically, the gel characteristics of a fluid have not been easy to measure directly; however, a viscosity measurement can be used as an indicator of the capacity of a fluid to suspend proppant. Therefore, a suspending agent can be referred to as a viscosifying agent. Viscosity is the resistance of a fluid to flow, defined as the ratio of shear stress to shear rate. The viscosity of a fluid can be expressed in units of centipoise ("cP").

If the proppant is not held in place after pumping the frac fluid, then the particles can flow towards the wellhead during production. This undesirable migration can cause damage to wellbore equipment and potentially a loss of integrity, for example to the fracture or wellbore. Therefore, it is often desirable to coat the particles with a resin to form a consolidated pack. The resin can be included in the frac fluid or subsequently introduced into the formation. The resin should have an affinity for the particles and should coat the particles. The resin can be a tacky resin that acts as a glue to bind the particles of the pack together. The resin can also be part of a consolidation system that generally comprises a curable resin and a curable agent. The curable agent causes the curable resin to cure and become hard and solid via a chemical reaction. After the resin cures, the particles of the pack are considered to be consolidated.

The particles of a consolidated pack can remain in the desired location either temporarily or permanently. If it is desirable to have a temporary consolidated proppant pack, then a breaker that can break down the cured resin can be introduced into the formation. However, depending on the resin, the breaker can be harmful or adversely affect wellbore equipment or the subterranean formation.

Generally, the viscosifier, the curable resin, and the curable agent are included in a frac fluid as separate ingredients or included in more than one type of treatment fluid. Of course, an increase in the number of ingredients and/or an increase in the number of types of treatment fluids needed will increase the overall cost of the fluids and lead to more complicated fluid systems. Thus, there is a need for improved ingredients that possess a dual- or multi-functionality. A dual- or multi-functionality additive can reduce the number of additives needed, thereby reducing costs, and providing simpler fluid systems.

It has been discovered that a polysaccharide can be derivatized to provide a dual- or multi-functionality. The polysaccharide can be derivatized to substitute some of the pendant functional groups of the polymer with furan. The derivatized polymer can be a viscosifier and curable resin. The furan groups can self-cure (i.e., a separate curable agent is not needed in order for the resin to cure and form a consolidated proppant pack). The derivatized polymer can provide the functionality of three separate additives (i.e., a viscosifying agent, curable resin and curable agent). Moreover, due to the naturally-occurring nature of the polysaccharide, the cured resin is removed more easily and is more environmentally-friendly compared to other kinds of resins used in consolidation systems.

A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain pendant functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer.

A polymer has an average molecular weight, which is directly related to the average chain length of the polymer. The average molecular weight of a polymer has an impact on some of the physical characteristics of a polymer, for example, its solubility and its dispersibility. For a copolymer, each of the monomers will be repeated a certain number of times (number of repeating units). The average molecular weight ($M_w$) for a copolymer can be expressed as follows:

$$M_w = \Sigma w_x M_x$$

where $w_x$ is the weight fraction of molecules whose weight is $M_x$.

According to an embodiment, a fracturing fluid comprises: a base fluid, wherein the base fluid comprises water; proppant; and an additive, wherein the additive: (i) is a cross-linkable polymer, wherein the polymer is a polysaccharide comprising a backbone and pendant functional groups, wherein the polysaccharide is derivatized by substituting one or more of the pendant functional groups with furan; (ii) is a viscosifying agent; and (iii) is a curable resin for consolidating the proppant.

According to another embodiment, a method of fracturing a subterranean formation comprises: introducing the fracturing fluid into the subterranean formation; and creating or enhancing one or more fractures in the subterranean formation.

It is to be understood that the discussion of preferred embodiments regarding the fracturing fluid ("frac fluid") or any ingredient in the frac fluid, is intended to apply to the method and composition embodiments. Any reference to the unit "gallons" means U.S. gallons.

The methods include introducing a fracturing fluid into the subterranean formation. The fracturing fluid includes a base fluid. The base fluid can be the continuous phase of the frac fluid. The base fluid comprises water. The water can be selected from the group consisting of freshwater, brackish water, saltwater, and any combination thereof. The fracturing fluid can further include a water-soluble salt. Preferably, the salt is selected from the group consisting of sodium chloride, calcium chloride, calcium bromide, potassium chloride, potassium bromide, magnesium chloride, sodium bromide, cesium formate, cesium acetate, and any combination thereof.

The fracturing fluid also includes proppant. As used herein, the term "proppant" means a multitude of solid, insoluble particles. The proppant can be naturally occurring, such as sand, or synthetic, such as a high-strength ceramic. Suitable proppant materials include, but are not limited to, sand (silica), walnut shells, sintered bauxite, glass beads, plastics, nylons, resins, other synthetic materials, and ceramic materials. Mixtures of different types of proppant can be used as well. The concentration of proppant in a fracturing fluid can be in any concentration known in the art, and preferably will be in the range of from about 0.01 kilograms to about 3 kilograms of proppant per liter of the base fluid (about 0.1 lb/gal to about 25 lb/gal). The size, sphericity, and strength of the proppant can be selected based on the actual subterranean formation conditions to be encountered during the fracturing operation.

The fracturing fluid also includes the additive. The additive is a cross-linkable polymer. As used herein, the term "cross-link" and all grammatical variations thereof means a connection between two or more polymer molecules. The polymer is a polysaccharide. The polysaccharide can include a mannose or glucose backbone and pendant functional groups. The pendant functional groups can include carboxylates, hydroxyls, diols, or phosphonic acid. Examples of polysaccharides include, but are not limited to, guar, cellulose, locust bean gum, and derivatives thereof. By way of example, derivatives of cellulose include carboxymethylcellulose "CMC," carboxymethyl hydroxyethyl cellulose "CMHEC," hydroxypropyl cellulose "HPC," hydroxyethyl methyl cellulose "HEMC," hydroxypropyl methyl cellulose "HPMC," and ethyl hydroxyethyl cellulose. According to a preferred embodiment, the polymer is poly-carboxymethylcellulose. Preferably, the backbone of the polysaccharide is water soluble. As used herein, "water soluble" means that at least 5 parts of the solute dissolves in 100 parts of water at a temperature of 73° F. (23° C.).

The polymer is cross-linkable. The fracturing fluid can further include a cross-linking agent. The cross-linking agent can be selected from the group consisting of aluminum, zirconium, titanium, chromium, and combinations thereof. According to an embodiment, the cross-linking agent includes a metal. The metal of the cross-linking agent preferably cross-links the polymer via the pendant functional groups of the polymer. For example, the metal of the cross-linking agent can cross-link two polymer molecules together via a chemical bond with the carboxylate or hydroxyl pendant groups of both of the polymer molecules. In this manner, the polymer molecules can be cross-linked together to form a cross-link network of polymer molecules. The cross-linking of the polymer molecules can occur when the fluid has a pH less than or equal to about 6.

The polymer can also have a molecular weight such that the additive is a viscosifying agent. The polymer can have a molecular weight in the range of about 200,000 to about 1,000,000.

The polysaccharide is derivatized by substituting one or more of the pendant functional groups with furan.

The additive is a viscosifying agent. It is believed that it is the cross-linking of the polysaccharide molecules that provides the desired viscosity to the fracturing fluid. Preferably, the amount of cross-linking is sufficient such that the additive is a viscosifying agent. Accordingly, not all (i.e., less than 100%) of the pendant functional groups should be substituted with the furan. Thus, at least some of the pendant functional groups are available to bond with the metal of the cross-linking agent. According to an embodiment, the amount of substitution is selected such that the additive is a viscosifying agent. Accordingly, the more sites that are available for bonding with the metal of the cross-linking agent, the more cross links that can be formed. Preferably, the additive increases the viscosity of the fracturing fluid to at least a sufficient viscosity such that the proppant is suspended in the base fluid. As used herein, "suspended" means that no more than 70% of the proppant settles to the bottom half of the base fluid. Preferably, the viscosity is sufficient such that the proppant is uniformly distributed throughout the base fluid. Preferably, the fracturing fluid has a desired viscosity that is in the range of about 200 to about 5,000 cP at shear rate of 40 s$^{-1}$. The additive can be in a sufficient concentration such that the fracturing fluid has the desired viscosity. According to an embodiment, the additive is in a concentration in the range of about 0.1% to about 2% by weight or volume of the base fluid.

The additive is also a curable resin for consolidating the proppant. The proppant can form a proppant pack after introduction into the subterranean formation. The curable resin can consolidate the proppant pack. It is believed that the furan groups function as the curable resin. Preferably, the additive has an attraction for and coats the proppant. According to an embodiment, the amount of substitution of the pendant functional groups is selected such that the additive is a curable resin for the proppant. Accordingly, a sufficient number of pendant functional groups are substituted with furan in order for the proppant to become consolidated by the additive. The amount of substitution can also be selected such that the consolidated proppant pack has a desired permeability. The desired permeability can be such that a reservoir fluid can be produced from the subterranean formation, through the consolidated proppant pack, and to the wellhead. According to an embodiment, the amount of substitution is in the range of about 1% to about 80%.

The furan is self-curing and can cure via an application of heat or due to the fluid having a pH less than or equal to about 6. As such, a separate curable agent for the curable resin is not needed. Accordingly, the fracturing fluid does not contain a curable agent for the additive. A curable agent does not need to be included in another type of treatment fluid either. According to an embodiment, the fracturing fluid further includes an acid, an acid precursor, or a buffering agent. The acid can be a protic acid or the acid precursor can be compounds that produce protic acids via hydrolysis in water. Preferably, the pH of the fracturing fluid is less than or equal to 6, more preferably in the range of about 2 to about 6. In this manner, the polymer can begin cross-linking and the furan can start to cure.

The fracturing fluid can further include additional additives including, but not limited to, breakers, biocides, buffers, clay control additives, scale inhibitors, proppant, friction reducers, salts, and fluid stabilizers.

The methods include the step of introducing the fracturing fluid into the subterranean formation. The step of introducing can comprise pumping the frac fluid into the subterranean formation. The subterranean formation can be penetrated by a well. The well can be, without limitation, an oil, gas, or water production well, an injection well, or a geothermal well. The well can also be an offshore well.

The methods also include creating or enhancing one or more fractures in the subterranean formation. The proppant can be deposited within the fractures during introduction of the frac fluid. The proppant can form a proppant pack within the fractures. The additive can coat the proppant. The additive can also bind the proppant of the proppant pack together. The methods can further include causing or allowing the additive to cure. The proppant of the proppant pack can become consolidated after curing.

The additive can also be removed or cleaned up from the subterranean formation after curing. According to an embodiment, a breaker for breaking the cured resin is introduced into the subterranean formation after the curable resin additive has cured. The breaker can be an oxidizer or enzyme. An example of a suitable breaker is an oxidizer, enzyme breakers, coated oxidizers or enzymes, delayed oxidizers, or acid- or base-releasing materials. The breaker can break at least some of the bonds of the polymer additive, for example, some of the bonds of the backbone of the polymer. Due to the naturally-occurring nature of the polysaccharide, the polymer is capable of being broken or cleaned up easier than other curable resins. The methods can further include flowing the broken additive towards the surface of the wellhead. The methods can also include producing a reservoir fluid from the subterranean formation.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of fracturing a subterranean formation comprising:
    introducing a fracturing fluid into the subterranean formation, wherein the fracturing fluid comprises:
        (A) a base fluid, wherein the base fluid comprises water;
        (B) proppant; and
        (C) an additive, wherein the additive:
            (i) is a cross-linkable polymer, wherein the polymer is a polysaccharide comprising a backbone and pendant functional groups, wherein the polysaccharide is derivatized by substituting one or more of the pendant functional groups with furan;
            (ii) is a viscosifying agent; and
            (iii) is a curable resin for consolidating the proppant; and
    creating or enhancing one or more fractures in the subterranean formation.

2. The method according to claim 1, wherein the water is selected from the group consisting of freshwater, brackish water, saltwater, and any combination thereof.

3. The method according to claim 1, wherein the proppant is selected from the group consisting of sand, walnut shells, sintered bauxite, glass beads, plastics, nylons, resins, other synthetic materials, ceramic materials, and combinations thereof.

4. The method according to claim 1, wherein the pendant functional groups are carboxylates, hydroxyls, diols, phosphonic acid, or combinations thereof.

5. The method according to claim 1, wherein the polysaccharide is guar, cellulose, locust bean gum, and derivatives thereof.

6. The method according to claim 5, wherein the polymer is poly-carboxymethylcellulose.

7. The method according to claim 1, wherein the fracturing fluid further comprises a cross-linking agent, wherein the cross-linking agent is selected from the group consisting of aluminum, zirconium, titanium, chromium, and combinations thereof.

8. The method according to claim 7, wherein the cross-linking agent crosslinks the polymer additive, and wherein the amount of cross-linking is sufficient such that the additive is a viscosifying agent.

9. The method according to claim 1, wherein the amount of substitution of the pendant functional groups is selected such that the additive is a viscosifying agent.

10. The method according to claim 1, wherein the additive increases the viscosity of the fracturing fluid to at least a sufficient viscosity such that the proppant is suspended in the base fluid.

11. The method according to claim 1, wherein the additive increases the viscosity of the fracturing fluid to at least a sufficient viscosity such that the proppant is uniformly distributed throughout the base fluid.

12. The method according to claim 1, wherein the proppant forms a proppant pack within the one or more fractures after introduction into the subterranean formation.

13. The method according to claim 12, wherein the curable resin additive consolidates the proppant pack.

14. The method according to claim 1, wherein the amount of substitution of the pendant functional groups is selected such that the additive is a curable resin for the proppant.

15. The method according to claim 1, wherein the furan cures via an application of heat or due to the fracturing fluid having a pH less than or equal to 6.

16. The method according to claim 15, wherein the fracturing fluid further includes an acid, an acid precursor, or a buffering agent.

17. The method according to claim 16, wherein the pH of the fracturing fluid is less than or equal to 6.

18. The method according to claim 15, further comprising causing or allowing the additive to cure, wherein the proppant becomes consolidated after curing.

19. The method according to claim 18, further comprising introducing a breaker for breaking the cured resin.

20. The method according to claim 1, wherein the step of introducing comprises using one or more pumps.

21. A fracturing fluid comprising:
    a base fluid, wherein the base fluid comprises water;
    proppant; and
    an additive, wherein the additive:
        (i) is a cross-linkable polymer, wherein the polymer is a polysaccharide comprising a backbone and pendant functional groups, wherein the polysaccharide is derivatized by substituting one or more of the pendant functional groups with furan;
(ii) is a viscosifying agent; and
(iii) is a curable resin for consolidating the proppant.

* * * * *